(12) United States Patent
Kawai

(10) Patent No.: US 6,239,448 B1
(45) Date of Patent: May 29, 2001

(54) RADIATION IMAGE READ-OUT METHOD AND APPARATUS

(75) Inventor: Yasuhiro Kawai, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/295,326

(22) Filed: Apr. 21, 1999

(30) Foreign Application Priority Data

Apr. 22, 1998 (JP) .................................................. 10-112002

(51) Int. Cl.⁷ .................................................. G01N 23/04
(52) U.S. Cl. ............................................ 250/586; 250/587
(58) Field of Search .................................... 250/586, 587

(56) References Cited

U.S. PATENT DOCUMENTS

| | | |
|---|---|---|
| 4,346,295 | 8/1982 | Tanaka et al. . |
| 5,402,338 * | 3/1995 | Ito ........................................ 250/587 |
| 5,483,081 * | 1/1996 | Hosoi .................................. 250/586 |

\* cited by examiner

*Primary Examiner*—Constantine Hannaher
*Assistant Examiner*—Andrew Israel
(74) *Attorney, Agent, or Firm*—Sughrue, Mion, Zinn, Macpeak & Seas, PLLC

(57) ABSTRACT

A stimulable phosphor sheet, on which a radiation image has been stored, is exposed to stimulating rays. Light emitted from the front surface of the stimulable phosphor sheet and light emitted from the back surface are detected with two photoelectric read-out devices located on the opposite surface sides of the sheet. Two image signals having thus been obtained are added in predetermined addition ratios w1 and w2. The spacing between a light guiding face of each photoelectric read-out device and a predetermined reference surface of the sheet and/or the thickness of the light guiding face is set, such that a total light guiding efficiency K, which is defined with Formula (1):

$$K = w1 \cdot k1 + w2 \cdot k2 \qquad (1)$$

in accordance with light guiding efficiencies k1 and k2 of the photoelectric read-out devices and the addition ratios w1 and w2, may become approximately equal to a predetermined value regardless of variations of the light guiding efficiencies k1 and k2 occurring due to partial rising or falling of the sheet from the reference surface.

14 Claims, 7 Drawing Sheets

FRONT SURFACE: LIGHT GUIDING EFFICIENCY k1

BACK SURFACE: LIGHT GUIDING EFFICIENCY k2 (S2=1.6)

BACK SURFACE; LIGHT GUIDING EFFICIENCY k2 (S2=2.8)

RADIATION IMAGE READ-OUT METHOD AND APPARATUS

BACKGROUND OF THE INVENTION

1. Field of the Invention

This invention relates to a radiation image read-out method and apparatus, wherein two image signals are respectively detected from the front and back surfaces of a stimulable phosphor sheet, on which a radiation image has been stored. This invention particularly relates to an improvement in a radiation image read-out method and apparatus, wherein the two image signals, which have respectively been detected from the front and back surfaces of the stimulable phosphor sheet, are added to each other in predetermined addition ratios, and an addition image signal is thereby obtained.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

As one of techniques for photoelectrically detecting the light emitted by a stimulable phosphor sheet, a novel radiation image read-out apparatus has been proposed in, for example, U.S. Pat. No. 4,346,295. In the proposed radiation image read-out apparatus, each of two photoelectric read-out means is located at one of the front and back surfaces of a stimulable phosphor sheet. Also, stimulating rays, which cause the stimulable phosphor sheet to emit light in proportion to the amount of energy stored thereon during its exposure to radiation, are irradiated to one surface or both surfaces of the stimulable phosphor sheet. Light, which is emitted by the front surface of the stimulable phosphor sheet, and light, which is emitted by the back surface of the stimulable phosphor sheet, are respectively detected by the two photoelectric read-out means. With the proposed radiation image read-out apparatus, a single radiation image is stored on the stimulable phosphor sheet, and the light emitted by the front surface of the stimulable phosphor sheet and the light emitted by the back surface of the stimulable phosphor sheet are respectively guided by the corresponding photoelectric read-out means. Therefore, the light guiding efficiency can be kept high. Also, the signal-to-noise ratio can be kept high by adding two image signals, which have been detected from the opposite surfaces of the stimulable phosphor sheet, to each other in predetermined addition ratios.

In cases where the stimulable phosphor sheet is used in the radiation image read-out apparatus, in which the technique for detecting two image signals from the opposite surfaces of the stimulable phosphor sheet is employed, a peripheral portion of the stimulable phosphor sheet is often curled and rises from the middle portion of the stimulable phosphor sheet due to bending caused by the passage through a bent conveyance path in the radiation image read-out apparatus, bending caused by deterioration with the passage of time, or the like. When the curled stimulable phosphor sheet is set at a position for image readout in the radiation image read-out apparatus described above, problems are encountered with the peripheral portion of the stimulable phosphor sheet, which portion rises to one side from a reference surface due to curl, in that the spacing between one surface of the peripheral portion and the corresponding photoelectric read-out means becomes narrow, and the spacing between the other surface of the peripheral portion and the corresponding photoelectric read-out means becomes wide.

As for the photoelectric read-out means located on the side of a surface of the stimulable phosphor sheet, at which the spacing between the photoelectric read-out means and the peripheral portion of the stimulable phosphor sheet has become narrow, the efficiency, with which the light emitted by the curling and rising portion of the stimulable phosphor sheet is guided by the photoelectric read-out means, becomes higher than the efficiency, with which the light emitted by the other portion of the stimulable phosphor sheet is guided by the photoelectric read-out means. Therefore, even if the intensity of the light emitted by the rising portion of the stimulable phosphor sheet and the intensity of the light emitted by the other portion of the stimulable phosphor sheet are identical with each other, the image signal value, which represents the intensity of the light emitted by the rising portion of the stimulable phosphor sheet, will become larger than the image signal value, which represents the intensity of the light emitted by the other portion of the stimulable phosphor sheet. As a result, in a visible image reproduced from the thus obtained image signal, the image density of an image area corresponding to the rising portion of the stimulable phosphor sheet becomes higher than the image density of an image area corresponding to the other portion of the stimulable phosphor sheet.

As for the photoelectric read-out means located on the side of the opposite surface of the stimulable phosphor sheet, the spacing between the photoelectric read-out means and the aforesaid peripheral portion of the stimulable phosphor sheet becomes wide. Therefore, the efficiency, with which the light emitted by the curling and rising portion of the stimulable phosphor sheet is guided by the photoelectric read-out means, becomes lower than the efficiency, with which the light emitted by the other portion of the stimulable phosphor sheet is guided by the photoelectric read-out means. Accordingly, in a visible image reproduced from the thus obtained image signal, the image density of an image area corresponding to the rising portion of the stimulable phosphor sheet becomes lower than the image density of an image area corresponding to the other portion of the stimulable phosphor sheet.

The problems described above with respect to curl of the stimulable phosphor sheet also occur due to waviness (continuation of rising and falling) of the stimulable phosphor sheet.

With the radiation image read-out apparatus for detecting two image signals from the opposite surfaces of the stimulable phosphor sheet, the two image signals having been detected are then added to each other. Therefore, it may be considered that, in the addition image signal having been obtained from the addition of the two image signals, the variations of the light guiding efficiencies of the two photoelectric read-out means due to the rising of the stimulable phosphor sheet compensate each other.

However, actually, the degree of variability, per unit rising or falling (unit curl or waviness) (in mm), of the light guiding efficiency of the photoelectric read-out means, which is located on the side of one surface of the stimulable phosphor sheet, and the degree of variability, per unit rising or falling, of the light guiding efficiency of the photoelectric read-out means, which is located on the side of the opposite surface of the stimulable phosphor sheet, do not necessarily coincide with each other. As a result, the total light guiding efficiency after being subjected to weighted addition varies in accordance with the degree of rising or falling of the stimulable phosphor sheet. Therefore, in the visible image reproduced from the addition image signal, the image density of the image area corresponding to the rising or falling portion of the stimulable phosphor sheet becomes different from the image density of the image area corresponding to the other portion of the stimulable phosphor sheet.

SUMMARY OF THE INVENTION

The primary object of the present invention is to provide a radiation image read-out method, wherein an operation for detecting two image signals from opposite surfaces of a stimulable phosphor sheet is carried out, such that variation of an addition image signal, which has been obtained from weighted addition of the two image signals detected from the opposite surfaces of the stimulable phosphor sheet, may be suppressed regardless of rising or falling of a portion of the stimulable phosphor sheet.

Another object of the present invention is to provide an apparatus for carrying out the radiation image read-out method.

A radiation image read-out method in accordance with the present invention is characterized by adjusting a spacing between a light guiding face of a photoelectric read-out means and a reference surface of a stimulable phosphor sheet and/or a thickness of the light guiding face, such that a total light guiding efficiency, in which weighting with addition ratios of two image signals having been detected from opposite surfaces of the stimulable phosphor sheet has been taken into consideration, may become approximately equal to a predetermined value.

Specifically, the present invention provides a radiation image read-out method, comprising the steps of:
  i) exposing a stimulablephosphor sheet, on which a radiation image has been stored, to stimulating rays, which cause the stimulable phosphor sheet to emit light in proportion to the amount of energy stored thereon during its exposure to radiation,
  ii) photoelectrically detecting the light, which is emitted from the front surface of the stimulable phosphor sheet, and the light, which is emitted from the back surface of the stimulable phosphor sheet, respectively with two photoelectric read-out means, which are located respectively on the sides of the front and back surfaces of the stimulable phosphor sheet, two image signals, which represent the radiation image, being thereby obtained, and
  iii) carrying out weighted addition of the two image signals to each other in predetermined addition ratios w1 and w2, an addition image signal being thereby obtained,
wherein a spacing between a light guiding face of each of the two photoelectric read-out means and a predetermined reference surface of the stimulable phosphor sheet and/or a thickness of the light guiding face of each of the two photoelectric read-out means is set, such that a total light guiding efficiency K, which is defined with Formula (1):

$$K = w1 \cdot k1 + w2 \cdot k2 \qquad (1)$$

in accordance with light guiding efficiencies k1 and k2 of the two photoelectric read-out means and the addition ratios w1 and w2, may become approximately equal to a predetermined value regardless of variations of the light guiding efficiencies k1 and k2 of the two photoelectric read-out means, which variations occur due to partial rising or falling of the stimulable phosphor sheet from the predetermined reference surface of the stimulable phosphor sheet.

The term "partial rising or falling of a stimulable phosphor sheet" as used herein means unevenness of the stimulable phosphor sheet to the directions of the front and back surfaces of the stimulable phosphor sheet, which unevenness occurs due to curl, waviness, or the like, of the stimulable phosphor sheet. Specifically, the term "partial rising or falling of a stimulable phosphor sheet" as used herein means the state in which, when the stimulable phosphor sheet is concave on one surface side, it is convex on the other surface side.

The term "predetermined reference surface" as used herein means each surface of the stimulable phosphor sheet at an area free from curl or waviness.

The term "thickness of a light guiding face" as used herein means the factor defining the area of the light guiding face by the product with the width of the light guiding face, which width corresponds to the width of the stimulable phosphor sheet. For example, in cases where the stimulable phosphor sheet is scanned with the stimulating rays in the main scanning direction and the sub-scanning direction, which are approximately normal to each other, and the length of the light guiding face along the direction of main scanning of the stimulable phosphor sheet with the stimulating rays is taken as the width of the light guiding face, the length of the light guiding face along the direction of sub-scanning (conveyance) of the stimulable phosphor sheet is taken as the thickness of the light guiding face.

The term "a total light guiding efficiency K being approximately equal to a predetermined value" as used herein is not limited to the cases wherein the total light guiding efficiency K does not vary from the predetermined value, and means that the total light guiding efficiency K varying within a slight width of variation from the predetermined value may be regarded as being identical with the predetermined value. The width of variation of the total light guiding efficiency K, in which the total light guiding efficiency K may be regarded as being identical with the predetermined, should preferably be within ±4.0%, should more preferably be within ±2.0%, and should most preferably be within ±1.0%. If the width of variation of the total light guiding efficiency K is within ±4.0%, non-uniformity of the image density in the reproduced visible image due to the variation of the total light guiding efficiency K will not adversely affect the image quality of the reproduced visible image and its capability of serving as an effective tool in, particularly, the efficient and accurate diagnosis of an illness.

The width of variation of the total light guiding efficiency K within ±4.0% should preferably be set in cases where the degree of partial rising or falling of the stimulable phosphor sheet falls within the range of ±1.0 mm with respect to the reference surface. The width of variation of the total light guiding efficiency K within ±2.0% should preferably be set in cases where the degree of partial rising or falling of the stimulable phosphor sheet falls within the range of ±0.6 mm with respect to the reference surface. Also, the width of variation of the total light guiding efficiency K within ±1.0% should preferably be set in cases where the degree of partial rising or falling of the stimulable phosphor sheet falls within the range of ±0.3 mm with respect to the reference surface.

In cases where the spacing between the light guiding face of each of the two photoelectric read-out means and the predetermined reference surface of the stimulable phosphor sheet and/or the thickness of the light guiding face of each of the two photoelectric read-out means is set, the spacing and/or the thickness of the light guiding face of the photoelectric read-out means, which is located on one surface side of the stimulable phosphor sheet, may be determined fixedly in accordance with other conditions, such as optimization of scanning characteristics of the stimulating rays, optimization of the light guiding efficiency, and minimization of flare. In such cases, the spacing and/or the thickness of the light guiding face of the photoelectric read-out means, which is located on the other surface side of the stimulable phosphor sheet, may be adjusted, such that the total light guiding efficiency K may become approximately equal to a predetermined value.

The stimulable phosphor sheet, which may be utilized in the radiation image read-out method in accordance with the present invention, may be provided with two stimulable phosphor layers respectively on the front and back surfaces. Alternatively, the stimulable phosphor sheet may be provided with a stimulable phosphor layer only on one surface side.

The present invention also provides a radiation image read-out apparatus, comprising:

i) means for exposing a stimulable phosphor sheet, on which a radiation image has been stored, to stimulating rays, which cause the stimulable phosphor sheet to emit light in proportion to the amount of energy stored thereon during its exposure to radiation, ii) two photoelectric read-out means, which are located respectively on the sides of the front and back surfaces of the stimulable phosphor sheet, the two photoelectric read-out means respectively photoelectrically detecting the light, which is emitted from the front surface of the stimulable phosphor sheet, and the light, which is emitted from the back surface of the stimulable phosphor sheet, two image signals, which represent the radiation image, being thereby obtained, and iii) means for carrying out weighted addition of the two image signals to each other in predetermined addition ratios w1 and w2, an addition image signal being thereby obtained, wherein a spacing between a light guiding face of each of the two photoelectric read-out means and a predetermined reference surface of the stimulable phosphor sheet and/or a thickness of the light guiding face of each of the two photoelectric read-out means is set, such that a total light guiding efficiency K, which is defined with Formula (1):

$$K = w1 \cdot k1 + w2 \cdot k2 \tag{1}$$

in accordance with light guiding efficiencies k1 and k2 of the two photoelectric read-out means and the addition ratios w1 and w2, may become approximately equal to a predetermined value regardless of variations of the light guiding efficiencies k1 and k2 of the two photoelectric read-out means, which variations occur due to partial rising or falling of the stimulable phosphor sheet from the predetermined reference surface of the stimulable phosphor sheet.

With the radiation image read-out method and apparatus in accordance with the present invention, the spacing between the light guiding face of each of the two photoelectric read-out means and the predetermined reference surface of the stimulable phosphor sheet and/or the thickness of the light guiding face of each of the two photoelectric read-out means is set, such that the total light guiding efficiency K, which is defined with Formula (1):

$$K = w1 \cdot k1 + w2 \cdot k2 \tag{1}$$

in accordance with the light guiding efficiencies k1 and k2 of the two photoelectric read-out means and the addition ratios w1 and w2, may become approximately equal to the predetermined value. Therefore, the total light guiding efficiency K can be kept approximately equal to the predetermined value regardless of variations of the light guiding efficiencies k1 and k2 of the two photoelectric read-out means, which variations occur due to partial rising or falling of the stimulable phosphor sheet from the predetermined reference surface of the stimulable phosphor sheet. As a result, variation of the addition image signal, which has been obtained from weighted addition of the two image signals detected from the opposite surfaces of the stimulable phosphor sheet, can be suppressed.

If the spacing between the light guiding face and the reference surface is set to be small, the light guiding efficiency can be kept high. However, in such cases, the degree of variability, per unit rising or falling, of the light guiding efficiency of the photoelectric read-out means, becomes low, and therefore the adjustment of the total light guiding efficiency K, which is defined with Formula (1) shown above, becomes not easy. If the spacing between the light guiding face and the reference surface is set to be large, the light guiding efficiency cannot be kept high. However, in such cases, the degree of variability, per unit rising or falling, of the light guiding efficiency of the photoelectric read-out means, becomes high, and therefore the adjustment of the total light guiding efficiency K becomes comparatively easy. Also, if the thickness of the light guiding face is set to be large, the light guiding efficiency can be kept high. However, in such cases, the degree of variability, per unit rising or falling, of the light guiding efficiency of the photoelectric read-out means, becomes low, and therefore the adjustment of the total light guiding efficiency K becomes not easy. If the thickness of the light guiding face is set to be small, the light guiding efficiency cannot be kept high. However, in such cases, the degree of variability, per unit rising or falling, of the light guiding efficiency of the photoelectric read-out means, becomes high, and therefore the adjustment of the total light guiding efficiency K becomes comparatively easy.

The objects of the present invention can also be achieved by directly adjusting the addition ratios w1 and w2 in Formula (1) shown above. However, the addition ratios are set previously such that, for example, noise in the addition image signal obtained from the addition of the two image signals may be reduced. Therefore, it is not preferable that the addition ratios are altered in accordance with the state of rising or falling of the stimulable phosphor sheet. The radiation image read-out method and apparatus in accordance with the present invention are advantageous particularly when the addition ratios cannot be altered arbitrarily.

DESCRIPTION OF THE PREFERRED EMBODIMENTS

The present invention will hereinbelow be described in further detail with reference to the accompanying drawings.

Figure 1:
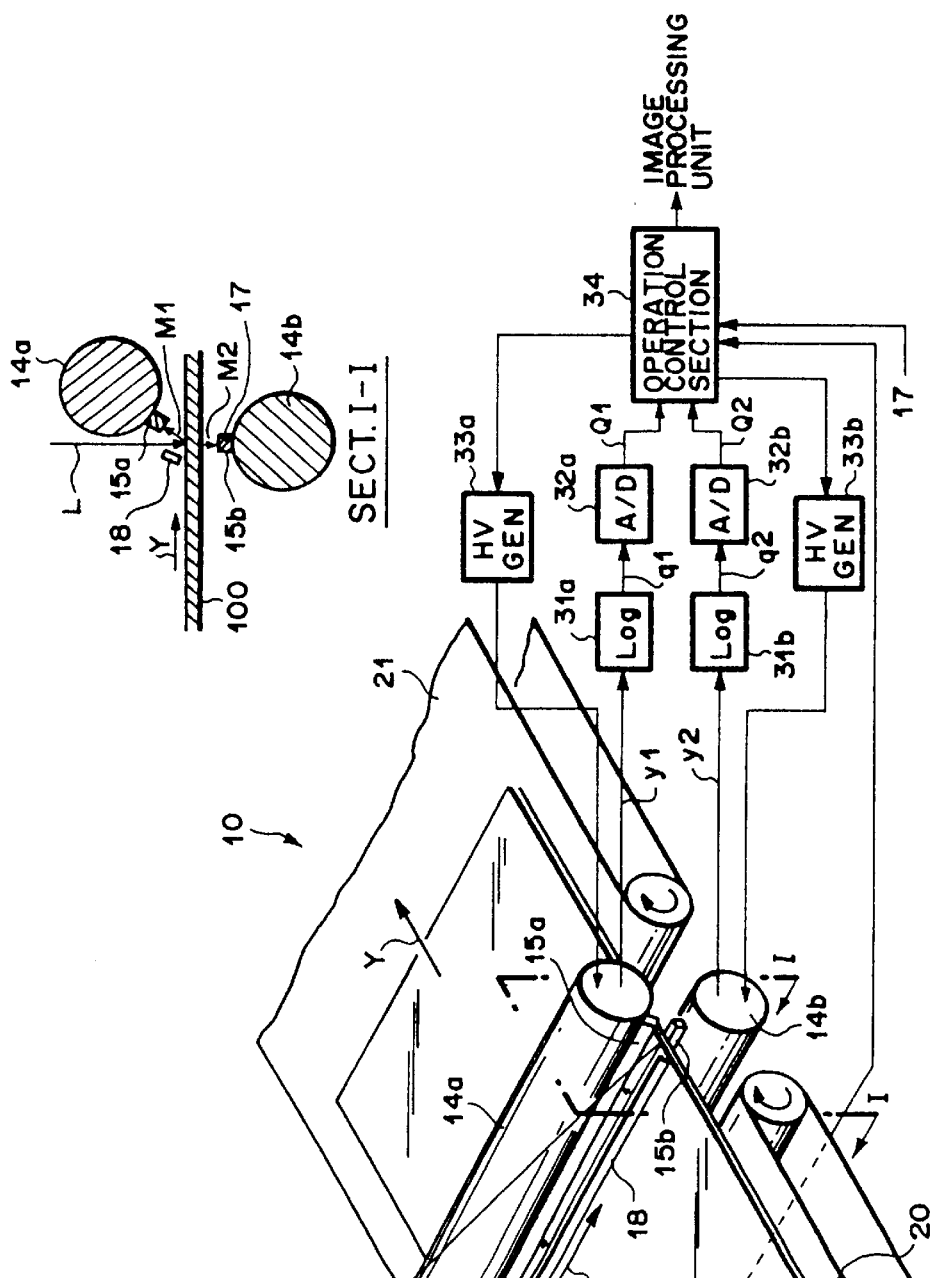
FIG. 1A is a perspective view showing an embodiment of the radiation image read-out apparatus in accordance with the present invention.
FIG. 1B is a sectional view taken along line I—I of FIG. 1A, FIG. 2 an explanatory sectional view taken along line I—I of FIG. 1A.
Figure 2:
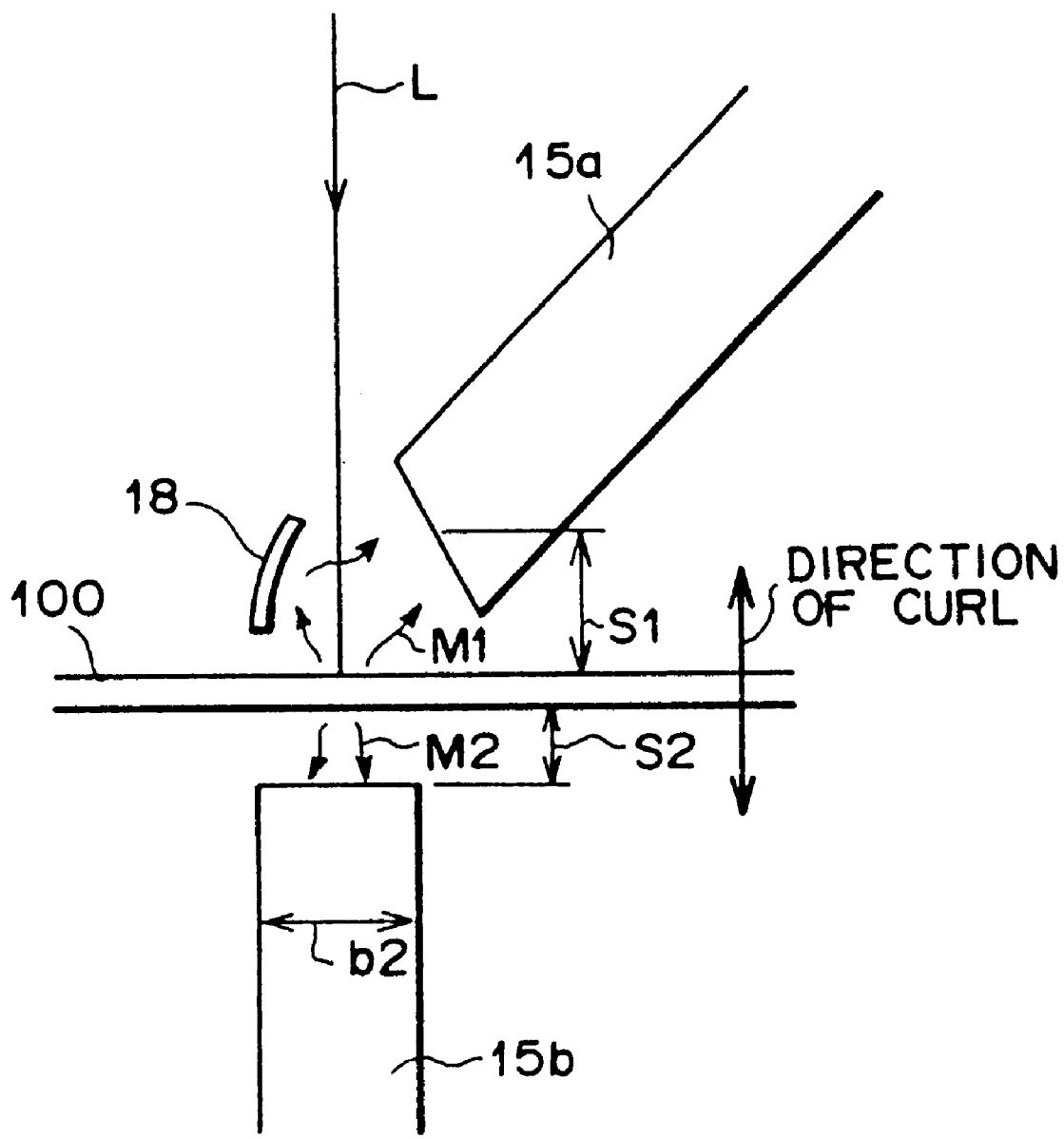

FIG. 1A is a perspective view showing an embodiment of the radiation image read-out apparatus in accordance with the present invention. FIG. 1B is a sectional view taken along line I—I of FIG. 1A. FIG. 2 is an explanatory sectional view taken along line I—I of FIG. 1A.

In an radiation image read-out apparatus 10 shown in FIG. 1A, a stimulable phosphor sheet, which is provided with stimulable phosphor layers formed respectively on the front surface side and the back surface side, is utilized, and a radiation image, which has been stored on the stimulable phosphor sheet, is read out from the front and back surfaces of the stimulable phosphor sheet. The front surface and the back surface of the stimulable phosphor sheet are discriminated for convenience's sake for merely explaining one surface and the other surface of the stimulable phosphor sheet, and either one of the opposite surfaces of the stimulable phosphor sheet may be taken as the front surface. In this embodiment, the surface of the stimulable phosphor sheet on the side, upon which radiation impinged when the radiation image was recorded on the stimulable phosphor sheet, is taken as the front surface. Also, the surface of the stimulable phosphor sheet on the opposite side, i.e. the surface of the stimulable phosphor sheet on the side, from which the radiation was radiated out, is taken as the back surface.

In the radiation image read-out apparatus 10, a stimulable phosphor sheet 100 is located on two endless belts 20 and 21, which are rotated by motors (not shown). A laser beam source 11 for producing a laser beam L, which causes the stimulable phosphor sheet to emit light in proportion to the amount of energy stored thereon during its exposure to the radiation, is located above the stimulable phosphor sheet 100. Also, a rotating polygon mirror 12, which reflects and deflects the laser beam L having been produced by the laser beam source 11 and is rotated by a motor (not shown), is located above the stimulable phosphor sheet 100. Further, a scanning lens (an fθ lens) 13 for converging the laser beam L, which has been reflected and deflected by the rotating polygon mirror 12, onto the stimulable phosphor sheet 100 and causing the laser beam L to scan the stimulable phosphor sheet 100 at uniform speed is located above the stimulable phosphor sheet 100.

The stimulable phosphor sheet 100 is scanned with the laser beam L along the main scanning direction, which is indicated by the arrow X. Also, the stimulable phosphor sheet 100 is conveyed by the endless belts 20 and 21 along the sub-scanning direction, which is indicated by the arrow Y and is approximately normal to the main scanning direction. As a result, the entire area of the stimulable phosphor sheet 100 is scanned with the laser beam L.

Further, a photomultiplier 14a is located above the front surface (the upper surface in FIG. 1A) of the stimulable phosphor sheet 100, which is scanned with the laser beam L. When the stimulable phosphor sheet 100 is stimulated by the laser beam L, light M1, which carries the image information stored on the stimulable phosphor sheet 100, is emitted from the front surface of the stimulable phosphor sheet 100. The photomultiplier 14a photoelectrically detects the emitted light M1 via a light guide member 15a and thereby obtains an analog image signal y1. The photomultiplier 14a is a long photomultiplier and has a light detecting face extending along the main scanning direction indicated by the arrow X, along which the laser beam L scans the front surface of the stimulable phosphor sheet 100. A light radiating end face of the light guide member 15a is coupled with the light detecting face of the photomultiplier 14a. The light guide member 15a has a light entry end face (light receiving face), which is located close to the front surface of the stimulable phosphor sheet 100. The light guide member 15a guides the emitted light M1, which has entered from the light entry end face of the light guide member 15a, to the light radiating end face of the light guide member 15a. A stimulating ray cut-off filter (not shown), which takes on the form of a thin film and filters out the laser beam L, is formed on the light entry end face of the light guide member 15a. Also, a long mirror 18, which extends along the main scanning direction with the laser beam L, is located close to the light entry end face of the light guide member 15a. The mirror 18 reflects a scattered portion of the emitted light M1, which is emitted by the stimulable phosphor sheet 100, toward the light entry end face of the light guide member 15a.

The photomultiplier 14a is connected to a logarithmic amplifier 31a, which carries out logarithmic conversion and amplification of the analog image signal y1 and thereby obtains a logarithmic image signal q1. The logarithmic amplifier 31a is connected to an analog-to-digital converting circuit (hereinbelow referred to as the A/D converting circuit) 32a. The logarithmic image signal q1 is sampled with a predetermined sampling period and converted into a digital image signal Q1 by the A/D converting circuit 32a.

A light guide member 15b is located close to the back surface (the lower surface in FIG. 1A) of the stimulable phosphor sheet 100, which surface is opposite to the front surface that is scanned with the laser beam L. The light guide member 15b guides light M2, which is emitted from the back surface of the stimulable phosphor sheet 100 when the stimulable phosphor sheet 100 is stimulated by the laser beam L. The light guide member 15b is connected to a long photomultiplier 14b, which photoelectrically detects the emitted light M2 having been guided by the light guide member 15b and thereby obtains an analog image signal y2. As illustrated in FIG. 1B, a sensor 17 is embedded in the light guide member 15b. The sensor 17 detects a leading end of the stimulable phosphor sheet 100 in the direction of conveyance of the stimulable phosphor sheet 100 when the stimulable phosphor sheet 100 is conveyed by the endless belts 20 and 21 in the sub-scanning direction indicated by the arrow Y. The sensor 17 thereby generates a reference signal, which serves as a reference for the beginning of the detection of the emitted light M2.

The photomultiplier 14b is connected to a logarithmic amplifier 31b, which carries out logarithmic conversion and amplification of the analog image signal y2 and thereby obtains a logarithmic image signal q2. The logarithmic amplifier 31b is connected to an A/D converting circuit 32b. The logarithmic image signal q2 is sampled with a predetermined sampling period and converted into a digital image signal Q2 by the A/D converting circuit 32b.

A voltage, which is generated by a voltage generator (HV GEN) 33a, is applied to the photomultiplier 14a. Also, a voltage, which is generated by a voltage generator (HV GEN) 33b, is applied to the photomultiplier 14b. The sensitivities of the photomultipliers 14a and 14b are set at predetermined values in accordance with the applied voltages.

A start end detecting photodetector 16 for synchronization in the main scanning direction (horizontal synchronization) is located at an end of the main scanning line with the laser beam L, which end is located in the region outside of the stimulable phosphor sheet 100.

Further, the radiation image read-out apparatus 10 is provided with an operation control section 34. The operation control section 34 carries out weighted addition of the digital image signals Q1 and Q2, which have been detected respectively from the front and back surfaces of the stimulable phosphor sheet 100, in predetermined addition ratios w1 and w2. (In this embodiment, w1=w2=0.5.)

The light guide member 15a and the photomultipliers 14a, which constitute one of the two photoelectric read-out means, and the light guide member 15b and the photomultipliers 14b, which constitute the other photoelectric read-out means, will be described hereinbelow with reference to FIG. 2 and FIGS. 3A, 3B, and 3C.

Figure 3A:
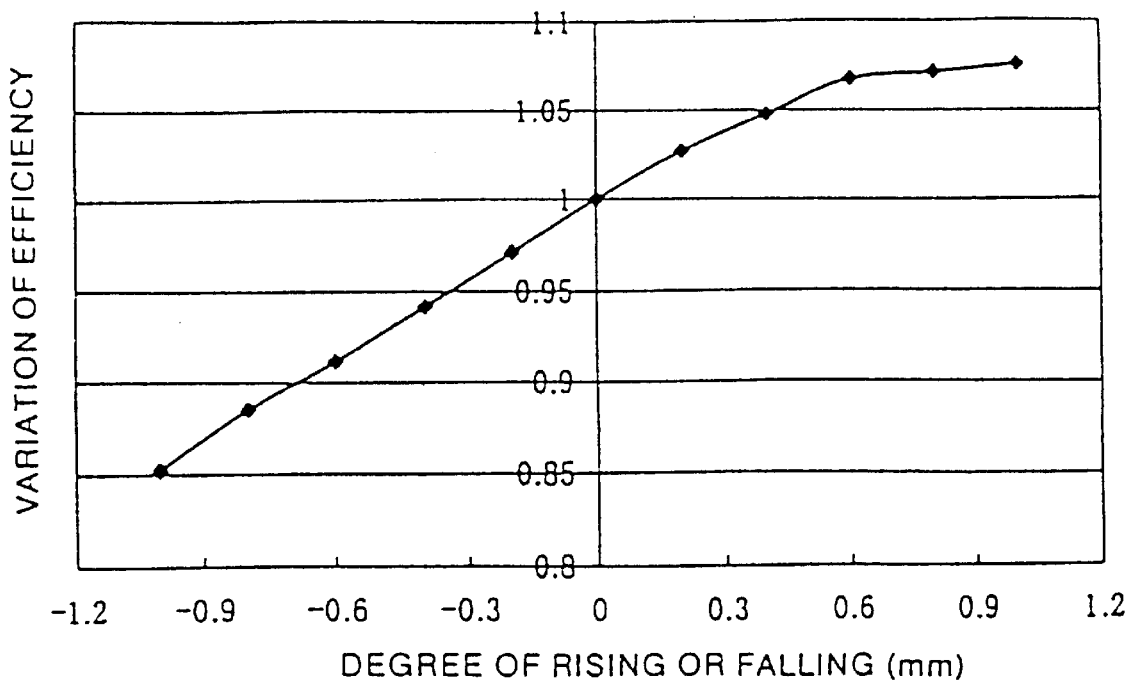
FIG. 3A is a graph showing (normalized) variation of a light guiding efficiency on a front surface side of a stimulable phosphor sheet.

As illustrated in FIG. 2, the light guide member 15a is located such that the center point of the light receiving face of the light guide member 15a may be located at a height of S1 from the upper surface (the reference surface) of the stimulable phosphor sheet 100. The location of the light guide member 15a is determined previously such that the path of the laser beam L, which scans the stimulable phosphor sheet 100, may be ensured, and such that the emitted light M1 may be received with a sufficient light guiding efficiency. FIG. 3A is a graph showing variation of a light guiding efficiency k1 of the photomultiplier 14a, which is located in a manner described above, with respect to the degree of rising or falling of the stimulable phosphor sheet 100. Specifically, in FIG. 3A, the horizontal axis represents the degree (in units of mm) of rising or falling of the stimulable phosphor sheet 100, and the vertical axis represents the light guiding efficiency with the light guiding efficiency of the photomultiplier 14a at the reference position S1 being taken as 1. The upward rising of the stimulable phosphor sheet 100 in FIG. 2 is expressed with a positive value, and the downward falling of the stimulable phosphor sheet 100 in FIG. 2 is expressed with a negative value. As illustrated in FIG. 3A, in cases where the stimulable phosphor sheet 100 has a curl rising upwardly, the spacing S1 becomes small, and the light guiding efficiency k1 becomes high. In cases where the stimulable phosphor sheet 100 has a curl falling downwardly, the spacing S1 becomes large, and the light guiding efficiency k1 becomes low.

Figure 3B:
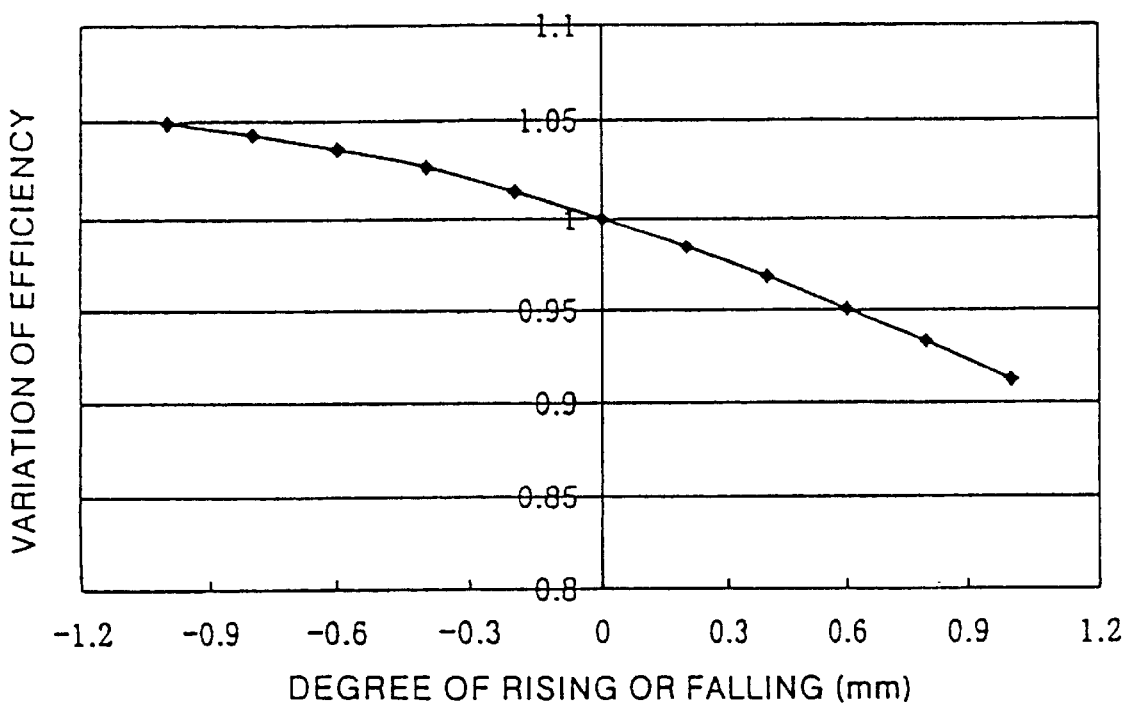
FIG. 3B is a graph showing (normalized) variation of a light guiding efficiency on a back surface side of a stimulable phosphor sheet (spacing S2: 1.6 mm)
Figure 3C:
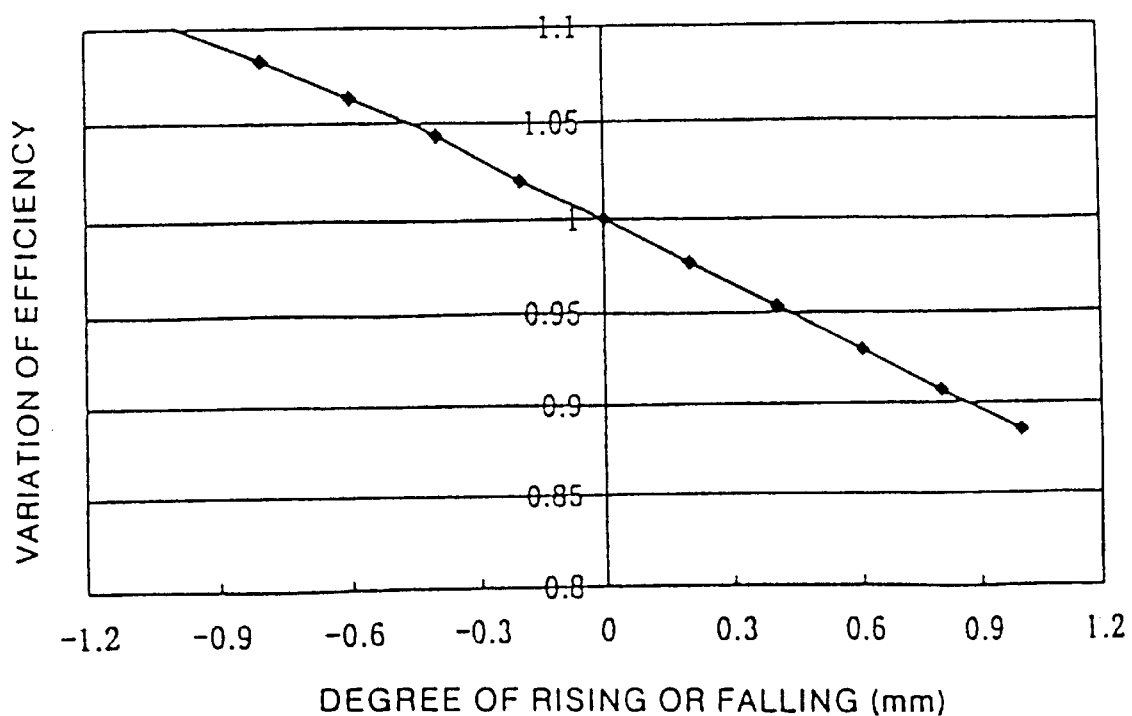
FIG. 3C is a graph showing (normalized) variation of a light guiding efficiency on a back surface side of a stimulable phosphor sheet (spacing S2: 2.8 mm)

Also, as illustrated in FIG. 2, the light guide member 15b is located such that the light receiving face of the light guide member 15b may be located at a spacing of S2 from the lower surface (the reference surface) of the stimulable phosphor sheet 100. As illustrated in FIGS. 3B and 3C, in cases where the value of S2 is altered from 1.6 mm (FIG. 3B) to 2.8 mm (FIG. 3C), the rate of variation (the degree of variability) of the light guiding efficiency (plotted on the vertical axis) with respect to the degree of rising or falling of the stimulable phosphor sheet 100 (plotted on the horizontal axis) becomes high. In FIGS. 3B and 3C, the upward rising of the stimulable phosphor sheet 100 in FIG. 2 is expressed with a positive value, and the downward falling of the stimulable phosphor sheet 100 in FIG. 2 is expressed with a negative value.

In this embodiment of the radiation image read-out apparatus, the value of S2 is set, such that a total light guiding efficiency K represented by Formula (1):

$$K = w1 \cdot k1 + w2 \cdot k2 \quad (1)$$

may become approximately equal to a predetermined value regardless of the degree of rising or falling of the stimulable phosphor sheet 100.

Figure 4:
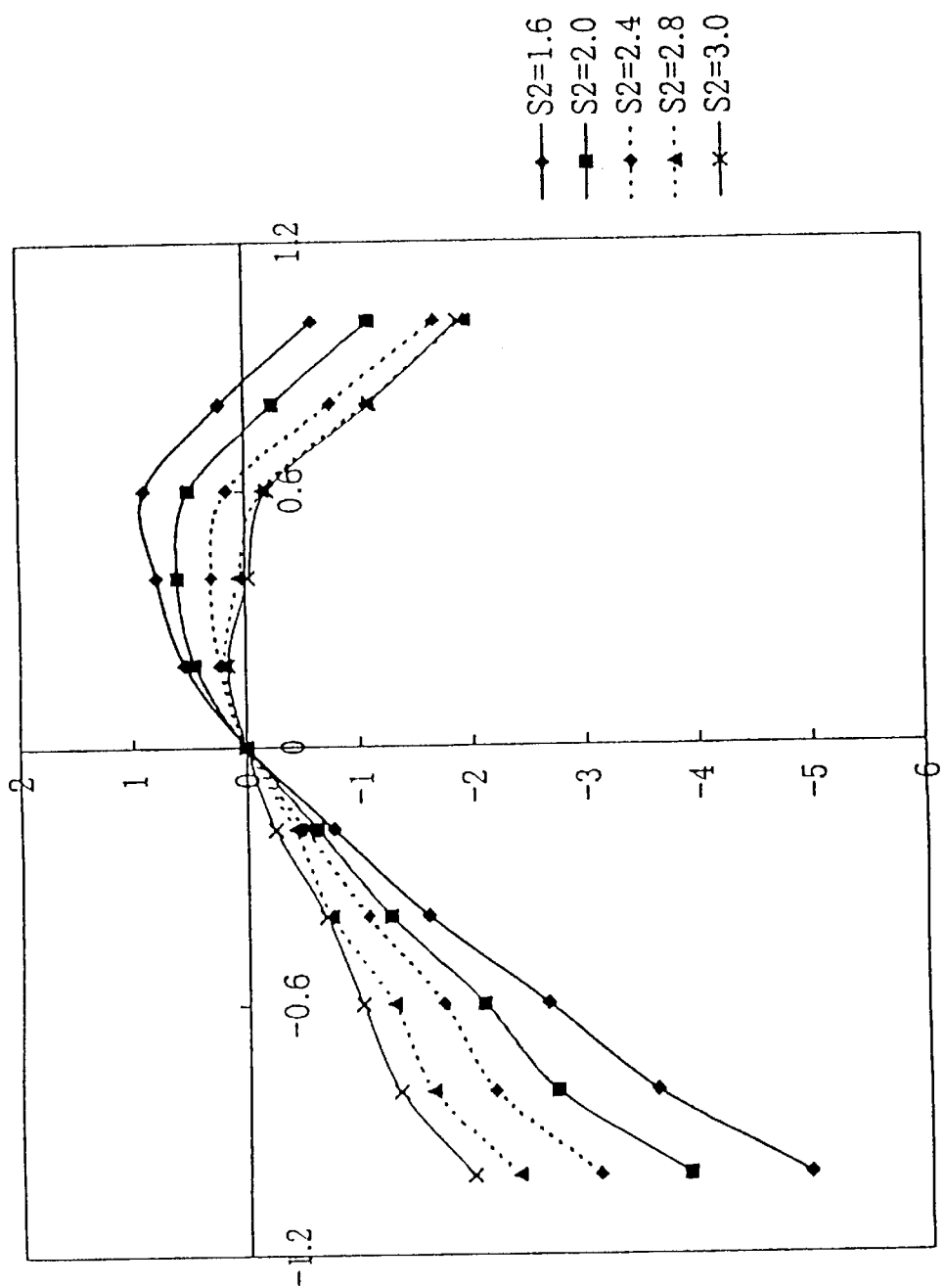
FIG. 4 is a graph showing degrees of variability of a total light guiding efficiency K with respect to unit rising or falling or a stimulable phosphor sheet, which are obtained when the value of a spacing S2 is altered.

Specifically, in cases where the addition ratios w1 and w2 are set to be equal to 0.5 in Formula (1) and the value of S2 is set at 1.6, 2.0, 2.4, 2.8, and 3.0 (mm), the degrees of variability (in %) of the total light guiding efficiency K with respect to the unit rising or falling of the stimulable phosphor sheet 100, which are illustrated in FIG. 4, are obtained (when the thickness, b2, of the light entry end face of the light guide member 15b located on the side of the back surface of the stimulable phosphor sheet 100, which thickness is taken along the sub-scanning direction on the stimulable phosphor sheet 100, is equal to 8 mm). The value of S2 may be determined such that the variation of the light guiding efficiency k1 of the photomultiplier 14a, which is located on the side of the upper surface of the stimulable phosphor sheet 100, per unit rising or falling of the stimulable phosphor sheet 100 (FIG. 3A) and the variation of the light guiding efficiency k2 of the photomultiplier 14b, which is located on the side of the lower surface of the stimulable phosphor sheet 100, per unit rising or falling of the stimulable phosphor sheet 100 may compensate each other, and such that the degree of variability of the total light guiding efficiency K may become low (for example, within ±4%). Specifically, the value of S2 may be set such that the degree of variability of the total light guiding efficiency K may be within ±4.0% in cases where the unit rising or falling of the stimulable phosphor sheet 100 falls within the range of ±1.0 mm. Alternatively, the value of S2 may be set such that the degree of variability of the total light guiding efficiency K may be within ±2.0% in cases where the unit rising or falling of the stimulable phosphor sheet 100 falls within the range of ±0.6 mm. As another alternative, the value of S2 may be set such that the degree of variability of the total light guiding efficiency K may be within ±1.0% in cases where the unit rising or falling of the stimulable phosphor sheet 100 falls within the range of ±0.3 mm.

In cases where the degree of variability of the total light guiding efficiency K may be merely minimized, as illustrated in FIG. 4, the S2 may be set to be equal to 3.0 mm. However, the absolute amount of light guided to the photomultiplier 14b becomes small as the value of S2 becomes large. Therefore, in this embodiment, such that a sufficient amount of light may be guided to the photomultiplier 14b and such that the width of variation of the total light guiding efficiency K may become approximately equal to a predetermined value, the value of S2 is set to be equal to 2.0 mm, at which the width of variation of the total light guiding efficiency K can be suppressed to a value within ±4.0% in cases where the unit rising or falling of the stimulable phosphor sheet 100 falls within the range of ±1.0 mm.

Experiments were carried out with respect to the degree of variability of the total light guiding efficiency K and the image quality of the reproduced visible image and its capability of serving as an effective tool in, particularly, the efficient and accurate diagnosis of an illness, which are affected by non-uniformity of the image density in the reproduced visible image due to the variation of the total light guiding efficiency K. The results shown in the table below were obtained.

| Degree of variability of total Light guiding efficiency K | 1% | 2% | 3% | 4% | 5% | 6% |
|---|---|---|---|---|---|---|
| Image quality (density non-uniformity) | ⊙ | ○ | △ | △ | x | x |

As shown in the table above, in cases where the absolute value of the degree of variability of the total light guiding efficiency K is larger than 4%, non-uniformity of the image density in the reproduced visible image becomes perceptible, and the image quality of the reproduced visible image and its capability of serving as an effective tool in, particularly, the efficient and accurate diagnosis of an illness, become low (as indicated by the "x" mark in the table). In cases where the absolute value of the degree of variability of the total light guiding efficiency K is at most 4%, the image quality of the reproduced visible image and its capability of serving as an effective tool in, particularly, the efficient and accurate diagnosis of an illness, does not become low (as indicated by the triangle mark in the table). In cases where the absolute value of the degree of variability of the total light guiding efficiency K is at most 2%, little adverse effect occurs on the image quality of the reproduced visible image and its capability of serving as an effective tool in, particularly, the efficient and accurate diagnosis of an illness (as indicated by the circle mark in the table). In cases where the absolute value of the degree of variability of the total light guiding efficiency K is at most 1%, no adverse effect occurs on the image quality of the reproduced visible image and its capability of serving as an effective tool in, particularly, the efficient and accurate diagnosis of an illness (as indicated by the double circle mark in the table).

The light guide members 15a and 15b are formed from an acryl material and are not provided a coating layer. Each of the light entry end faces of the light guide members 15a and 15b may be provided with a reflection suppressing coating layer.

How the radiation image read-out apparatus 10 operates will be described hereinbelow.

With a radiation image recording apparatus (not shown), the radiation image is recorded on the stimulable phosphor sheet 100. The stimulable phosphor sheet 100, on which the radiation image has been stored, is then set at a predetermined position on the endless belt 20. The stimulable phosphor sheet 100, which has been set at the predetermined position, is conveyed by the endless belt 20 in the sub-scanning direction indicated by the arrow Y. The sensor 17, which is embedded in the light guide member 15b located on the side of the back surface of the stimulable phosphor sheet 100, detects the leading end of the stimulable phosphor sheet 100, which is being conveyed in the sub-scanning direction. The sensor 17 feeds the reference signal, which serves as a reference for the beginning of the detection of the emitted light, into the operation control section 34.

In accordance with the received reference signal, which serves as a reference for the beginning of the detection of the emitted light, the operation control section 34 controls the voltage generators 33a and 33b. In accordance with the control by the operation control section 34, the voltage generators 33a and 33b apply predetermined levels of voltages to the photomultipliers 14a and 14b.

The laser beam L, which has been produced by the laser beam source 11, is reflected and deflected by the rotating polygon mirror 12, which is rotating quickly in the direction indicated by the arrow. The deflected laser beam L is converged by the scanning lens 13 onto the front surface of the stimulable phosphor sheet 100. The front surface of the stimulable phosphor sheet 100 is thereby scanned with the laser beam L at uniform speed along the main scanning direction, which is indicated by the arrow X. The timing, with which the main scanning is begun, is detected by the start end detecting photodetector 16. Information representing the results of the detection of the timing, with which the main scanning is begun, is fed into the operation control section 34, and sampling clock pulses for the A/D converting circuit 32a are thereby generated.

The laser beam L, which has impinged upon the stimulable phosphor sheet 100, stimulates the stimulable phosphor of the stimulable phosphor sheet 100. The light M1 carrying the stored radiation image information is emitted from the front surface of the stimulable phosphor sheet 100. Also, the light M2 carrying the stored radiation image information is emitted from the back surface of the stimulable phosphor sheet 100.

The light M1, which has been emitted from the front surface of the stimulable phosphor sheet 100, is guided by the light guide member 15a, which is located close to the upper surface of the stimulable phosphor sheet 100, into the photomultiplier 14a and is photoelectrically detected by the photomultiplier 14a. The light M2, which has been emitted from the back surface of the stimulable phosphor sheet 100, is guided by the light guide member 15b, which is located close to the lower surface of the stimulable phosphor sheet 100, into the photomultiplier 14b and is photoelectrically detected by the photomultiplier 14b.

The photomultiplier 14a converts the emitted light M1, which has been detected photoelectrically from the front surface of the stimulable phosphor sheet 100, into the analog image signal y1 and feeds the analog image signal y1 into the logarithmic amplifier 31a. The logarithmic amplifier 31a carries out the logarithmic amplification of the analog image signal y1 and thereby obtains the logarithmic image signal q1. The logarithmic image signal q1 is fed into the A/D converting circuit 32a. The A/D converting circuit 32a converts the received logarithmic image signal q1 into the digital image signal Q1. The digital image signal Q1 is fed into the operation control section 34.

The photomultiplier 14b converts the emitted light M2, which has been detected photoelectrically from the back surface of the stimulable phosphor sheet 100, into the analog image signal y2 and feeds the analog image signal y2 into the logarithmic amplifier 31b. The logarithmic amplifier 31b carries out the logarithmic amplification of the analog image signal y2 and thereby obtains the logarithmic image signal q2. The logarithmic image signal q2 is fed into the A/D converting circuit 32b. The A/D converting circuit 32b converts the received logarithmic image signal q2 into the digital image signal Q2. The digital image signal Q2 is fed into the operation control section 34.

The operation control section 34 carries out weighted addition of image signal components of the two received digital image signals Q1 and Q2 to each other, which image signal components represent corresponding pixels in the images represented by the digital image signals Q1 and Q2. The weighted addition is carried out in the addition ratios w1 and w2, and an addition image signal (w1·Q1+w2·Q2) is obtained from the weighted addition. The addition image signal is fed into an image processing unit.

In cases where partial curl (for example, curl rising toward the front surface side of the stimulable phosphor sheet 100) occurs at a peripheral portion, or the like, of the stimulable phosphor sheet 100, the spacing S1 between the front surface of the stimulable phosphor sheet 100 and the light guide member 15a becomes small, and the spacing S2 between the back surface of the stimulable phosphor sheet 100 and the light guide member 15b becomes large. As a result, as illustrated in FIG. 3A, the light guiding efficiency of the photomultiplier 14a via the light guide member 15a with respect to the rising portion of the stimulable phosphor sheet 100 becomes higher than the light guiding efficiency with respect to the other portion of the stimulable phosphor sheet 100 free from curl. Also, the light guiding efficiency of the photomultiplier 14b via the light guide member 15b with respect to the rising portion of the stimulable phosphor sheet 100 becomes lower than the light guiding efficiency with respect to the other portion of the stimulable phosphor sheet 100 free from curl (the tendency is the same as that illustrated in FIG. 3B or FIG. 3C).

However, with this embodiment of the radiation image read-out apparatus 10, the light guide member 15a on the front surface side of the stimulable phosphor sheet 100 and the light guide member 15b on the back surface side of the stimulable phosphor sheet 100 are located such that the total light guiding efficiency K represented by Formula (1) shown above may become approximately equal to the predetermined value regardless of the degree of rising or falling of the stimulable phosphor sheet 100 (such that the degree of variability of the total light guiding efficiency K may be within ±4.0% in cases where the unit rising or falling of the stimulable phosphor sheet 100 falls within the range of ±1.0 mm). Therefore, after the weighted addition has been carried out by the operation control section 34 and on the digital image signal Q1, which has been detected on the front surface side of the stimulable phosphor sheet 100 such that the light guiding efficiency may be high, and the digital image signal Q2, which has been detected on the back surface side of the stimulable phosphor sheet 100 such that the light guiding efficiency may be low, the addition image signal as illustrated in FIG. 4 is obtained, in which the variation of each light guiding efficiency has been suppressed to a value within ±4.0%.

As described above, with this embodiment of the radiation image read-out apparatus 10, variation of the addition image signal, which has been obtained from weighted addition of the two image signals detected from the opposite surfaces of the stimulable phosphor sheet, can be suppressed regardless of variations of the light guiding efficiencies k1 and k2 of the photomultipliers 14a and 14b due to partial rising or falling of a portion of the stimulable phosphor sheet 100.

Figure 5:
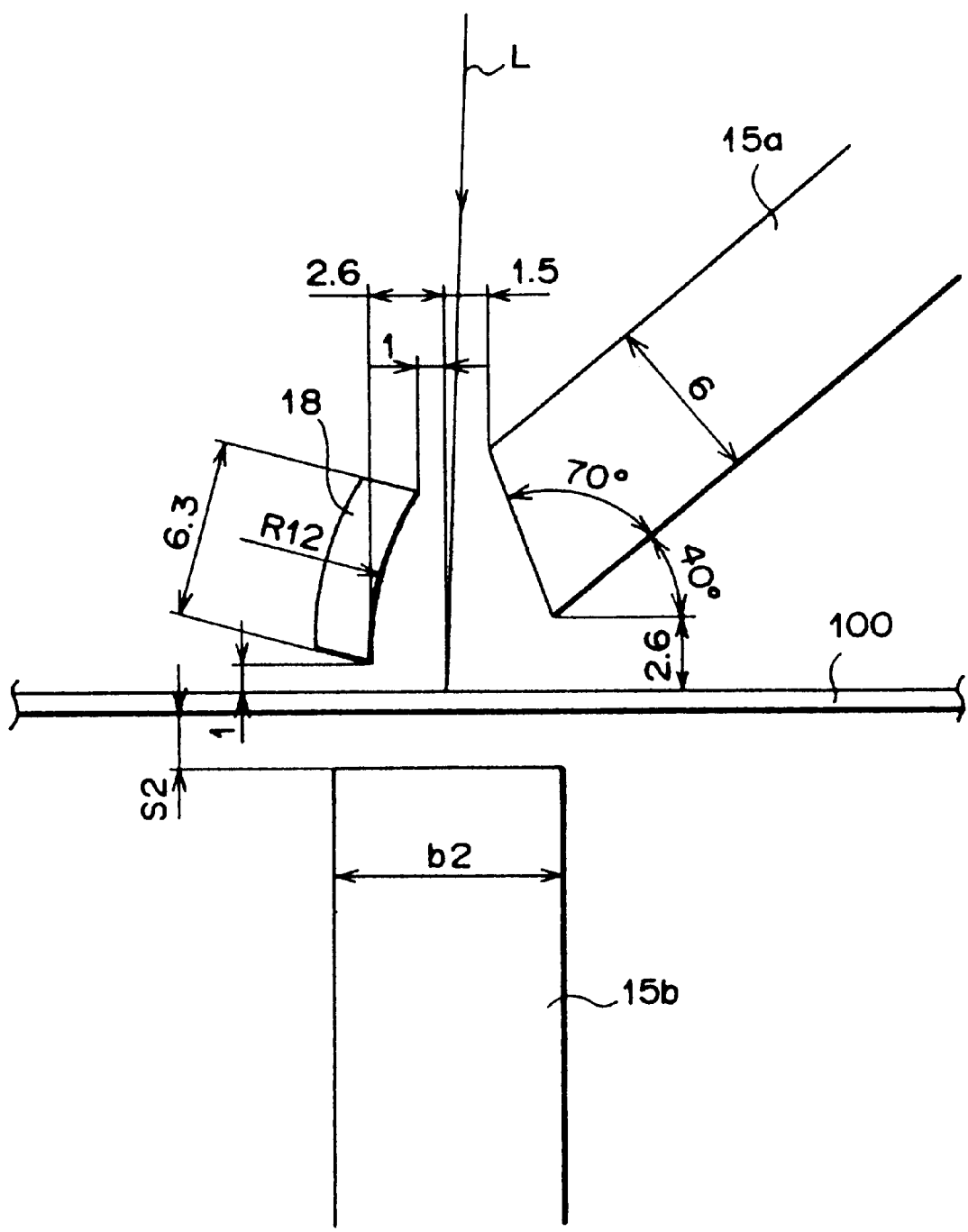
FIG. 5 is explanatory view showing dimensions of parts of the radiation image read-out apparatus shown in FIG. 2.

FIG. 5 shows dimensions of parts of the radiation image read-out apparatus shown in FIG. 2.

In this embodiment of the radiation image read-out apparatus, the rates of variation of the light guiding efficiencies of the photomultipliers 14a and 14b with respect to unit rising or falling are rendered to approximately coincide with each other by setting the spacing S2 between the light entry end face (the light guiding face) of the light guide member 15b, which is located on the back surface side of the stimulable phosphor sheet 100, and the back surface of the stimulable phosphor sheet 100 to be equal to the predetermined value. The rates of variation of the light guiding efficiencies of the photomultipliers 14a and 14b with respect to unit rising or falling can be rendered to approximately coincide with each other also with a radiation image read-out apparatus, in which the thickness b2 of the light entry end face of the light guide member 15b located on the side of the back surface of the stimulable phosphor sheet 100 as shown in FIG. 2, which thickness is taken along the sub-scanning direction on the stimulable phosphor sheet 100, is set to be equal to a predetermined value. In such cases, if the thickness b2 of the light entry end face of the light guide member 15b is set to be large, the degree of variability of the light guiding efficiency of the photomultiplier 14b per unit rising or falling of the stimulable phosphor sheet 100 will become small. If the thickness b2 of the light entry end face of the light guide member 15b is set to be small, the degree of variability of the light guiding efficiency of the photomultiplier 14b per unit rising or falling of the stimulable phosphor sheet 100 will become large.

Figure 6:
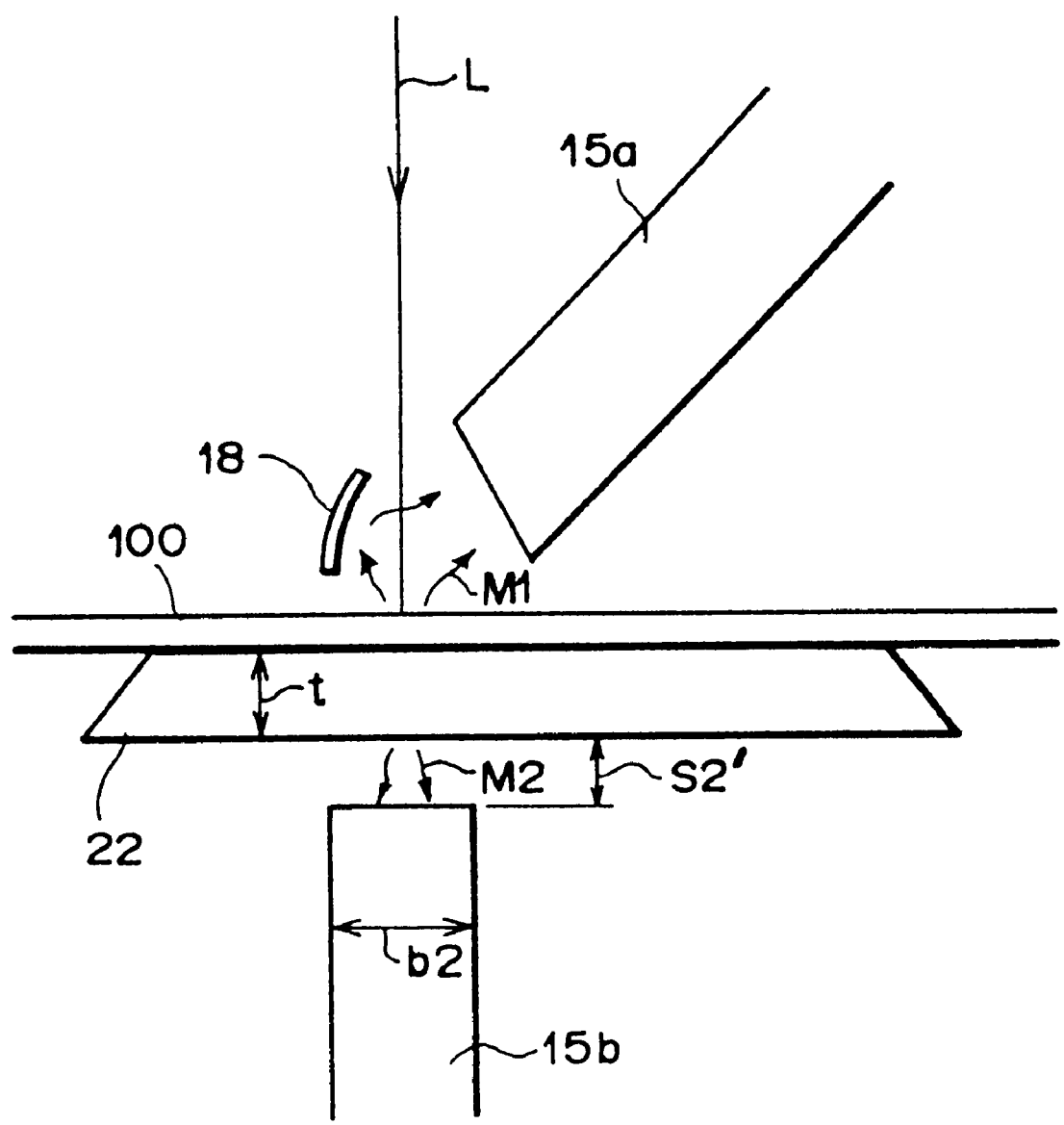
FIG. 6 is a sectional view of a different embodiment of the radiation image read-out apparatus in accordance with the present invention, in which a transparent guide plate is employed.

FIG. 6 is a sectional view of a different embodiment of the radiation image read-out apparatus in accordance with the present invention, in which a transparent guide plate is employed. In the embodiment of FIG. 6, a flat plate-like transparent guide plate 22 is located between the endless belts 20 and 21, which convey the stimulable phosphor sheet 100. The guide plate 22 supports the lower surface (i.e., the back surface) of the stimulable phosphor sheet 100. In this embodiment, a spacing S2' between the lower surface of the guide plate 22 and the light guide member 15b, which is located on the back surface side of the stimulable phosphor sheet 100, may be adjusted in the same manner as that for the space S2 in the aforesaid embodiment of FIG. 2. In the radiation image read-out apparatus in which the guide plate 22 is employed, such that a decrease in light guiding efficiency may be suppressed, a thickness t of the guide plate 22 should preferably be set to be at most ½ of the thickness b2 of the light guide member 15b. The guide plate 22 may be provided with a reflection suppressing coating layer.

What is claimed is:

1. A radiation image read-out method, comprising the steps of:

i) exposing a stimulable phosphor sheet, on which a radiation image has been stored, to stimulating rays, which cause the stimulable phosphor sheet to emit light in proportion to the amount of energy stored thereon during its exposure to radiation, ii) photoelectrically detecting the light, which is emitted from the front surface of the stimulable phosphor sheet, and the light, which is emitted from the back surface of the stimulable phosphor sheet, respectively with two photoelectric read-out means, which are located respectively on the sides of the front and back surfaces of the stimulable phosphor sheet, two image signals, which represent the radiation image, being thereby obtained, and iii) carrying out weighted addition of the two image signals to each other in predetermined addition ratios w1 and w2, an addition image signal being thereby obtained, wherein a spacing between a light guiding face of each of the two photoelectric read-out means and a predetermined reference surface of the stimulable phosphor sheet and/or a thickness of the light guiding face of each of the two photoelectric read-out means is set, such that a total light guiding efficiency K, which is defined with Formula (1):

$$K = w1 \cdot k1 + w2 \cdot k2 \qquad (1)$$

in accordance with light guiding efficiencies k1 and k2 of the two photoelectric read-out means and the addition ratios w1 and w2, may become approximately equal to a predetermined value regardless of variations of the light guiding efficiencies k1 and k2 of the two photoelectric read-out means, which variations occur due to partial rising or falling of the stimulable phosphor sheet from the predetermined reference surface of the stimulable phosphor sheet.

2. A method as defined in claim 1 wherein a width of variation of the total light guiding efficiency K is within ±4.0%.

3. A method as defined in claim 2 wherein the width of variation of the total light guiding efficiency K within ±4.0% is set in cases where a degree of partial rising or falling of the stimulable phosphor sheet falls within the range of ±1.0 mm with respect to the reference surface.

4. A method as defined in claim 1 wherein a width of variation of the total light guiding efficiency K is within ±2.0%.

5. A method as defined in claim 4 wherein the width of variation of the total light guiding efficiency K within ±2.0% is set in cases where a degree of partial rising or falling of the stimulable phosphor sheet falls within the range of ±0.6 mm with respect to the reference surface.

6. A method as defined in claim 1 wherein a width of variation of the total light guiding efficiency K is within ±1.0%.

7. A method as defined in claim 6 wherein the width of variation of the total light guiding efficiency K within ±1.0% is set in cases where a degree of partial rising or falling of the stimulable phosphor sheet falls within the range of ±0.3 mm with respect to the reference surface.

8. A radiation image read-out apparatus, comprising:

i) means for exposing a stimulable phosphor sheet, on which a radiation image has been stored, to stimulating rays, which cause the stimulable phosphor sheet to emit light in proportion to the amount of energy stored thereon during its exposure to radiation, ii) two photoelectric read-out means, which are located respectively on the sides of the front and back surfaces of the stimulable phosphor sheet, the two photoelectric read-out means respectively photoelectrically detecting the light, which is emitted from the front surface of the stimulable phosphor sheet, and the light, which is emitted from the back surface of the stimulable phosphor sheet, two image signals, which represent the radiation image, being thereby obtained, and iii) means for carrying out weighted addition of the two image signals to each other in predetermined addition ratios w1 and w2, an addition image signal being thereby obtained, wherein a spacing between a light guiding face of each of the two photoelectric read-out means and a predetermined reference surface of the stimulable phosphor sheet and/or a thickness of the light guiding face of each of the two photoelectric read-out means is set, such that a total light guiding efficiency K, which is defined with Formula (1):

$$K = w1 \cdot k1 + w2 \cdot k2 \qquad (1)$$

in accordance with light guiding efficiencies k1 and k2 of the two photoelectric read-out means and the addition ratios w1 and w2, may become approximately equal to a predetermined value regardless of variations of the light guiding efficiencies k1 and k2 of the two photoelectric read-out means, which variations occur due to partial rising or falling of the stimulable phosphor sheet from the predetermined reference surface of the stimulable phosphor sheet.

9. An apparatus as defined in claim 8 wherein a width of variation of the total light guiding efficiency K is within ±4.0%.

10. An apparatus as defined in claim 9 wherein the width of variation of the total light guiding efficiency K within ±4.0% is set in cases where a degree of partial rising or falling of the stimulable phosphor sheet falls within the range of ±1.0 mm with respect to the reference surface.

11. An apparatus as defined in claim 8 wherein a width of variation of the total light guiding efficiency K is within ±2.0%.

12. An apparatus as defined in claim 11 wherein the width of variation of the total light guiding efficiency K within ±2.0% is set in cases where a degree of partial rising or falling of the stimulable phosphor sheet falls within the range of ±0.6 mm with respect to the reference surface.

13. An apparatus as defined in claim 8 wherein a width of variation of the total light guiding efficiency K is within ±1.0%.

14. An apparatus as defined in claim 13 wherein the width of variation of the total light guiding efficiency K within ±1.0% is set in cases where a degree of partial rising or falling of the stimulable phosphor sheet falls within the range of ±0.3 mm with respect to the reference surface.

* * * * *